(12) United States Patent
Robinson

(10) Patent No.: US 12,318,977 B2
(45) Date of Patent: Jun. 3, 2025

(54) METHOD OF MANUFACTURING A LOAD STRUCTURE

(71) Applicant: Gemini Group, Inc., Bad Axe, MI (US)

(72) Inventor: Mark Robinson, Bad Axe, MI (US)

(73) Assignee: GEMINI GROUP, INC., Bad Axe, MI (US)

(*) Notice: Subject to any disclaimer, the term of this patent is extended or adjusted under 35 U.S.C. 154(b) by 584 days.

(21) Appl. No.: 17/683,184

(22) Filed: Feb. 28, 2022

(65) Prior Publication Data

US 2022/0184864 A1 Jun. 16, 2022

Related U.S. Application Data

(63) Continuation-in-part of application No. 16/251,918, filed on Jan. 18, 2019, now Pat. No. 11,331,894.

(51) Int. Cl.
*B29C 45/14* (2006.01)
*B29K 75/00* (2006.01)
(Continued)

(52) U.S. Cl.
CPC .. *B29C 45/14508* (2013.01); *B29C 45/14688* (2013.01); *B29C 45/14786* (2013.01);
(Continued)

(58) Field of Classification Search
CPC ......... B32B 37/1284; B32B 3/12; B32B 7/12; B32B 17/065; B32B 29/02;
(Continued)

(56) References Cited

U.S. PATENT DOCUMENTS 3,912,569 A 10/1975 Kapral
4,552,913 A 11/1985 Wolfe et al.
(Continued)

FOREIGN PATENT DOCUMENTS

DE 10310368 A1 10/2004
DE 102015002358 A1 8/2016
(Continued)

OTHER PUBLICATIONS

European Office Action, 21188984.5, dated Aug. 17, 2022.
(Continued)

*Primary Examiner* — George R Koch
*Assistant Examiner* — Christopher C Caillouet
(74) *Attorney, Agent, or Firm* — Brooks Kushman P.C.

(57) ABSTRACT

A method of manufacturing a load structure may include forming a panel having a first side and a second side, clearing a fill passage through the panel, providing a tool having a first portion, a second portion, and a cavity disposed between the first and second portions, disposing a film onto a surface of the first portion of the tool, disposing the panel within the cavity such that the second side of the panel engages the second portion of the tool, and the first side of the panel is spaced apart from the surface of the first portion of the tool defining a void, and injecting a coating through the fill passage such that the coating fills the void and the film adheres to the first side of the panel.

20 Claims, 16 Drawing Sheets

(51) Int. Cl.
  *B29K 711/12* (2006.01)
  *B29L 31/30* (2006.01)
(52) U.S. Cl.
  CPC ....... *B29K 2075/00* (2013.01); *B29K 2711/12* (2013.01); *B29K 2995/0025* (2013.01); *B29L 2031/30* (2013.01)
(58) Field of Classification Search
  CPC ............ B32B 2255/02; B32B 2255/26; B32B 2305/024; B32B 2471/00; B32B 37/146; B62D 25/20; B29C 2045/14967; B29C 45/14344; B29C 44/06; B29C 44/12; B29C 44/18; B60R 13/011; B29L 2031/608
  See application file for complete search history.

(56) References Cited

U.S. PATENT DOCUMENTS

| | | | |
|---|---|---|---|
| 4,626,023 | A | 12/1986 | Lutz |
| 4,783,298 | A * | 11/1988 | Oda ................... B29C 43/146 264/254 |
| 5,002,334 | A | 3/1991 | Meiler et al. |
| 5,964,491 | A | 10/1999 | Marsh et al. |
| 6,474,729 | B2 | 11/2002 | Patz et al. |
| 7,017,981 | B2 | 3/2006 | Strohmavr et al. |
| 7,128,365 | B2 | 10/2006 | Kiesewetter et al. |
| 7,462,311 | B2 | 12/2008 | Kralik et al. |
| 7,524,389 | B2 | 4/2009 | Elbs et al. |
| 7,798,565 | B2 | 9/2010 | Johl et al. |
| 7,942,475 | B2 | 5/2011 | Murray |
| 8,511,742 | B2 | 8/2013 | Legler et al. |
| 8,834,985 | B2 * | 9/2014 | Preisler ................ B32B 3/263 428/116 |
| 9,090,148 | B2 | 7/2015 | Kiesewetter et al. |
| 9,327,471 | B2 | 5/2016 | Legler et al. |
| 9,440,679 | B2 | 9/2016 | Lee et al. |
| 9,776,488 | B2 | 10/2017 | Bowles |
| 10,400,448 | B2 | 9/2019 | Gosling et al. |
| 10,913,233 | B2 | 2/2021 | Dietz et al. |
| 11,331,894 | B2 * | 5/2022 | Robinson .......... B29C 45/14344 |
| 2003/0044548 | A1 | 3/2003 | Kaufmann |
| 2003/0143373 | A1 | 7/2003 | Bledsoe et al. |
| 2003/0218363 | A1 | 11/2003 | Strohmavr et al. |
| 2004/0018789 | A1 | 1/2004 | Marchbanks et al. |
| 2004/0104600 | A1 | 6/2004 | Kiesewetter et al. |
| 2005/0001347 | A1 | 1/2005 | Kralik et al. |
| 2005/0003208 | A1 | 1/2005 | Graf et al. |
| 2005/0029839 | A1 | 2/2005 | Stemmer |
| 2005/0242469 | A1 | 11/2005 | Elbs et al. |
| 2006/0108716 | A1 | 5/2006 | Strohmavr et al. |
| 2008/0145608 | A1 | 6/2008 | Bledsoe et al. |
| 2009/0260736 | A1 | 10/2009 | Charette |
| 2010/0052211 | A1 | 3/2010 | Chen et al. |
| 2010/0140984 | A1 | 6/2010 | Murray |
| 2011/0101731 | A1 | 5/2011 | Legler et al. |
| 2011/0226312 | A1 | 9/2011 | Bohm et al. |
| 2011/0262703 | A1 | 10/2011 | Legler et al. |
| 2011/0305869 | A1 | 12/2011 | Pollak et al. |
| 2012/0231244 | A1 | 9/2012 | Legler et al. |
| 2012/0308768 | A1 | 12/2012 | Mishra et al. |
| 2013/0154150 | A1 | 6/2013 | Shimazoe et al. |
| 2013/0243998 | A1 | 9/2013 | Preuss et al. |
| 2013/0280473 | A1 | 10/2013 | Preisler et al. |
| 2014/0145470 | A1 | 5/2014 | Preisler |
| 2014/0159418 | A1 | 6/2014 | Kiesewetter et al. |
| 2015/0050485 | A1 | 2/2015 | Wagner et al. |
| 2016/0176153 | A1 * | 6/2016 | Dietz .................. B29C 67/246 428/116 |
| 2016/0263976 | A1 | 9/2016 | Bowles |
| 2018/0036993 | A1 | 2/2018 | Savonuzzi |
| 2018/0050580 | A1 | 2/2018 | Sviberg et al. |
| 2018/0290418 | A1 * | 10/2018 | Nelson .................. B32B 27/08 |

FOREIGN PATENT DOCUMENTS

| | | |
|---|---|---|
| EP | 0492532 A2 | 7/1992 |
| EP | 3613577 A1 | 2/2020 |
| FR | 2757794 A1 | 7/1998 |
| FR | 2913385 A1 | 9/2008 |
| GB | 2531942 A | 5/2016 |
| JP | S5742713 A | 3/1982 |
| JP | H07171847 A | 7/1995 |

OTHER PUBLICATIONS

Plastics Today Staff, Honeycomb structure car roof boasts class—A finish, Aug. 13, 2015 (Year: 2015).
European Communication Pursuant to Article 94(3) EPC Issued Aug. 12, 2020.
EESR EP19179003.
Non-Final Office Action; related U.S. Appl. No. 17/743,964; date of mailing Sep. 29, 2024, 20 pgs.

* cited by examiner

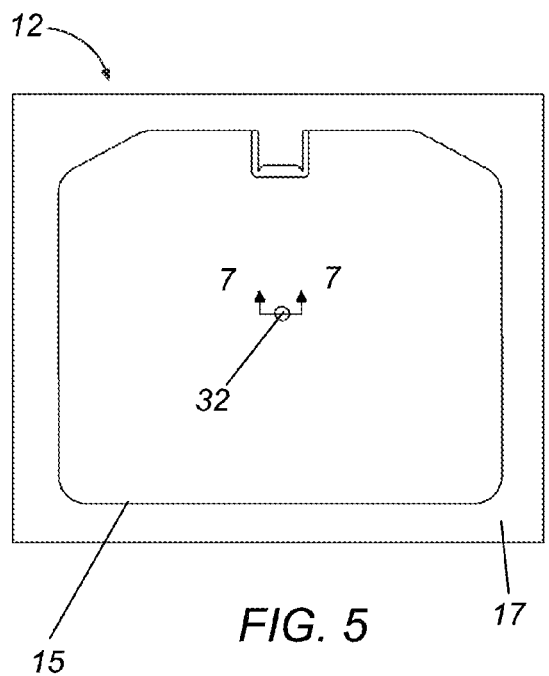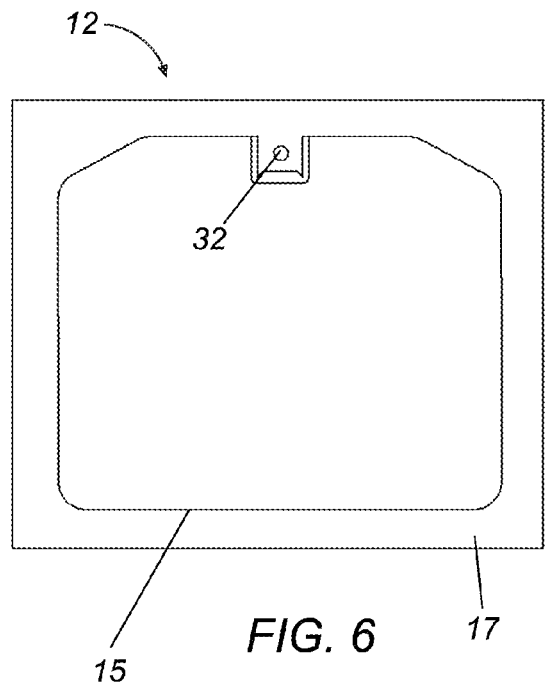
FIG. 5   FIG. 6
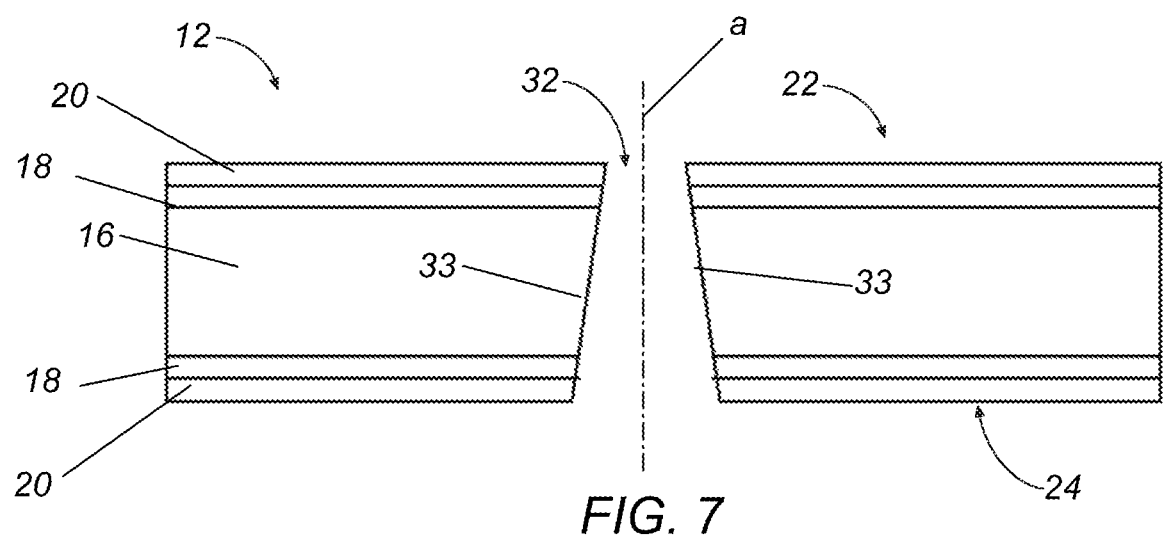
FIG. 7

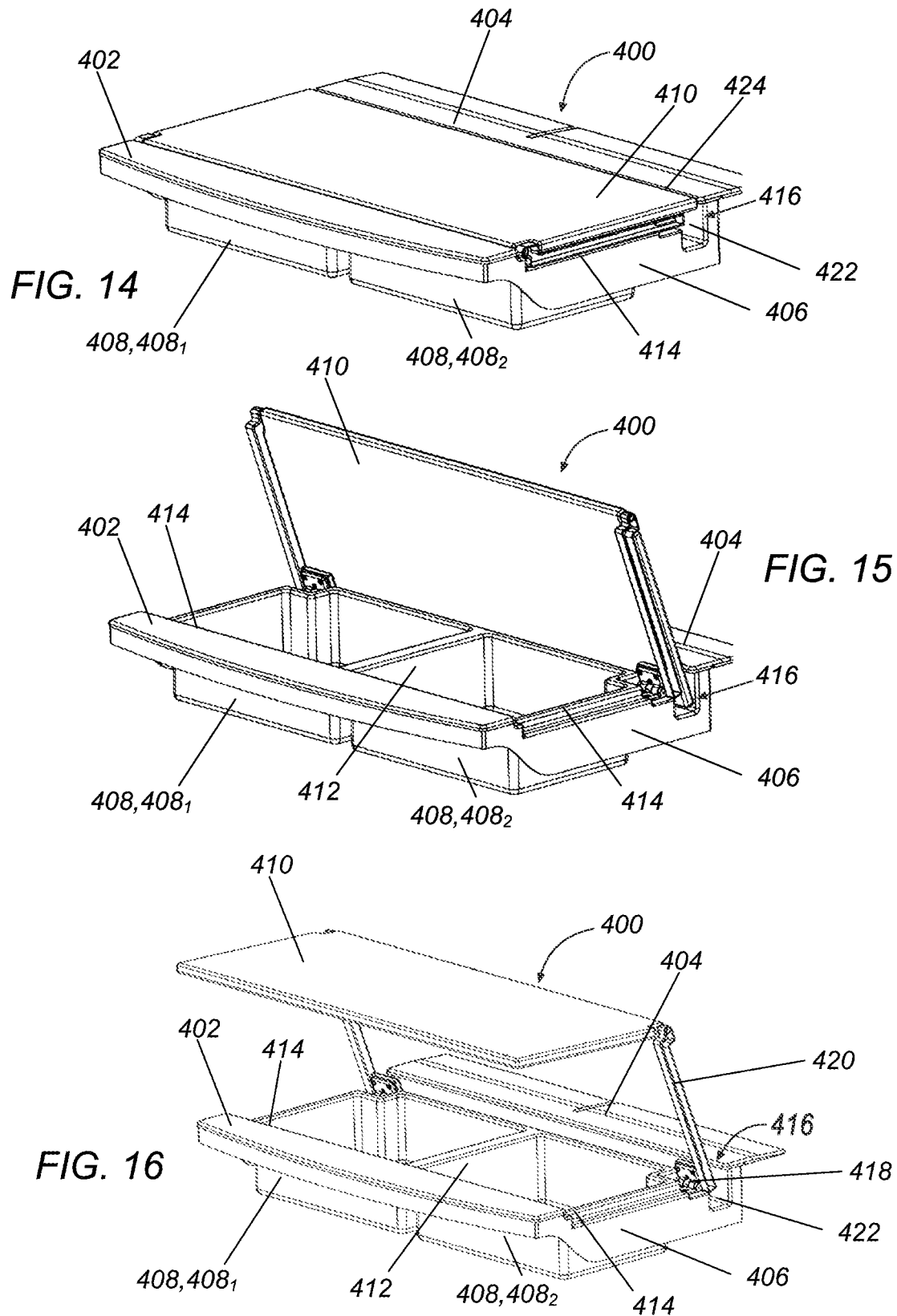

METHOD OF MANUFACTURING A LOAD STRUCTURE

CROSS-REFERENCE TO RELATED APPLICATION

This application is a continuation-in-part of U.S. patent application Ser. No. 16/251,918 filed on Jan. 18, 2019, now U.S. Pat. No. 11,331,894 issued on May 17, 2022, which is hereby incorporated by reference in its entirety.

FIELD OF TECHNOLOGY

The present disclosure pertains to a method of manufacturing a load structure that may be employed, for example, but not limited to, in a vehicle where a load is applied, such as a floor, hood, side panel, roofing, and the like.

BACKGROUND

Load structures are incorporated in various applications, for example, as floors, hoods, side panels, roofing, and the like, in automobiles and other vehicles. The load structures generally are panels having a first side, which may be visible, and a second side, that may be concealed. In some applications, the visible side (sometimes referred to as the "A-side") may be carpeted, and the concealed side (sometimes referred to as the "B-side") may be left bare or have scrim, such as felt, added thereto. The load structure may be installed in a location susceptible to mud, water, high-vapor, and the like. To protect the load structure from such elements, a floor mat is often added over the load structure, which may add weight and additional cost. Another method is to adhesively bond a layer of thermoplastic olefin (TPO), vinyl or similar material to the panel, which is expensive and heavy.

Accordingly, an improved load structure is presented that has reduced weight and/or cost while still providing protection from weather elements, such as mud and water.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

FIG. 5 is a top view of an un-trimmed panel for the load structure of FIGS. 1 and 2;

FIG. 6 is a top view of an un-trimmed panel for the load structures of FIGS. 3 and 4;

FIG. 7 is a partial cross-section through the untrimmed panels of FIGS. 5 and 6 taken from the perspective of arrows 7-7;

FIGS. 14-16 are different views of a load structure according to another exemplary approach, showing a storage compartment in the closed position and then in extended positions.

DETAILED DESCRIPTION

Figure 1:
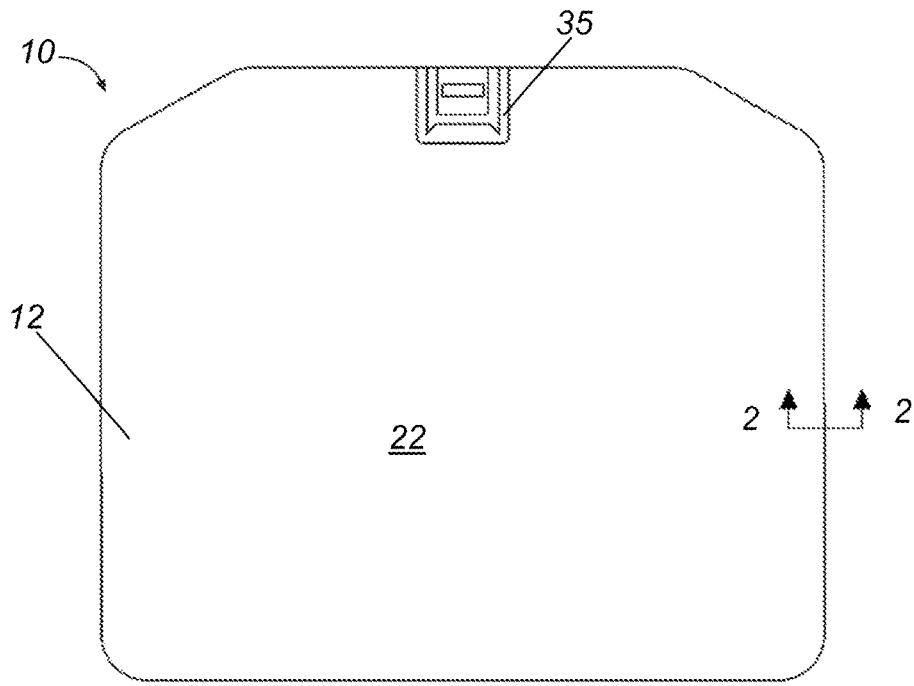
FIG. 1 is a top view of an exemplary load structure having a non-edge-wrapped configuration.

Referring to the figures, FIGS. 1-4 depict load structures 10 according to different exemplary approaches. While the load structures 10 are depicted as a vehicle load floor, it should be appreciated that the load structure may be used and/or embodied in a number of other applications and/or structures, including, but not limited to, floor panels, floor mats, load floors, tail gates, hoods, body panels, vehicle members, vehicle components, component structures, structural members, aircraft members, vessel members, consumer goods, tables, walls, construction members, building components, stall dividers, semi-trailers, truck components, truck beds, cargo vans, and utility trailers. For example, as seen in FIGS. 14-16, the load structures 10 may be embodied as adjustable storage lids in a vehicle, as described in more detail hereinafter.

The load structure 10 generally may include a panel 12, which may have a hollow construction. The panel 12 may have a core 14, which may be made of a honeycomb paper 16 with a layer of glass 18 over the honeycomb paper 16. The glass layer may be random or oriented. The panel 12 may also include a polyurethane coating 20 around the core 14. The polyurethane coating 20 may be a foaming or a non-foaming structure. The polyurethane coating 20 generally provides a cosmetic, cleanable, and waterproof surface, and further allows for the feel, texture, hardness, and/or color of the finished product be changed.

Figure 2:
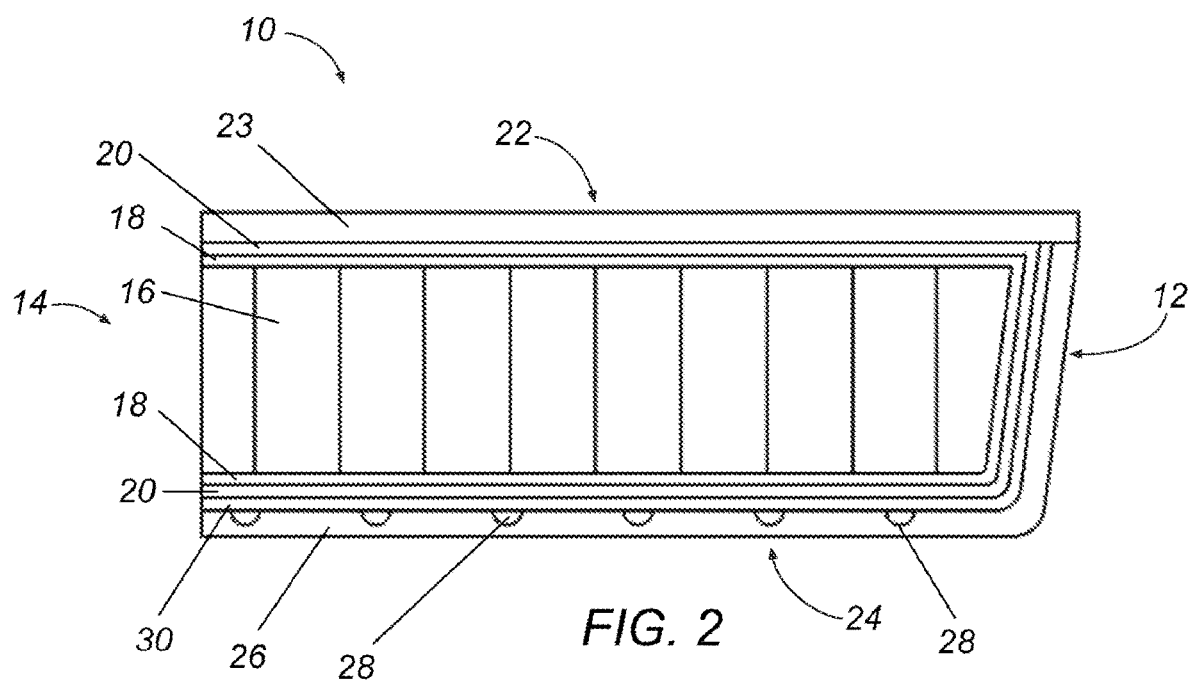
FIG. 2 is a partial cross-section through the load structure of FIG. 1 taken from the perspective of arrows 2-2.

For aesthetics, the panel 12 may be covered on its first side 22 with a layer 23 of various weights of woven and/or non-woven carpets, felt, or similar material. The second side 24 of the panel 12 may be covered with a lighter weight, non-woven, or the glass urethane layer can be left exposed. The first side 22 may be the side exposed to the consumer/user (sometimes referred to as the "A-side"), while the second side 24 may be concealed (sometimes referred to as the "B-side"). Alternatively, the first side 22 may be the B-side, and the second side 24 may be the A-side. In certain embodiments, the load structure 10 may have a non-edge-wrapped configuration in which the layer 23 may be disposed primarily on the first side 22, as illustrated in FIGS. 1 and 2. In other embodiments, the load structure 10 may have an edge-wrapped configuration in which the layer 23 may wrap around an edge of the panel 12 from the first side 22 to the second side 24 at least partially along a perimeter of the panel 12. The layer 23 of carpet or felt may have a thermoplastic polyurethane (TPU) backing (for example, in the non-edge-wrapped configuration and/or may be applied or adhered to the panel 12 via an adhesive (for example, in the edge-wrapped configuration).

The load structure 10 may also include an over rim coating 26 on at least the second side 24 of the panel 12. The over rim coating 26 generally may be formed from a resin injected on to the second side 24, as described in more detail hereinafter. The resin may be, but is not limited to, a polyurethane that may be elastomeric or rigid and/or aromatic or aliphatic. As merely one example, the over rim coating 26 may have a thickness ranging between 0.5 mm and 4.0 mm.

The panel 12 may be formed with one or more protrusions 28 that protrude from the second side 24 of the panel 12. The protrusion(s) 28 generally may be provided to help maintain the shape of the panel, e.g., prevent or minimize deflection of the panel 12 due to its span/width, during the injection process of the resin for the over mold coating 26, and ensure that the resin coats the correct side of the panel 12. The protrusion(s) 28 may be "bumps" with rounded surfaces. Alternatively, or in addition, the protrusion(s) 28 may be elongated ribs, though it should be appreciated that the protrusion(s) 28 may have any geometric configuration to maintain the shape of the panel 12 and ensure that the resin coats the correct side of the panel 12. The protrusion(s) 28 may have a height less than the thickness of the over rim coating 26 such that the over rim coating 26 covers the protrusion(s) 28. For example, the height may be a maximum of 0.2 mm less than the thickness of the over rim coating 26.

The load structure 10 may further include a barrier layer 30 on at least the second side of the panel 12 before the over rim coating 26. The barrier layer 30 generally may provide a barrier to the resin of the over rim coating 26 from seeping into the core 14 during the injection process due to the injection pressure associated therewith, which could add weight, cost, and quality issues with the load structure 10. The material of the barrier layer 30 may be a glass, fiber, scrim (e.g., polyester, nylon, etc.), paper, or thermoplastic polyurethane (TPU) or a combination thereof. Where the barrier material is glass, fiber, scrim, or paper, the barrier layer 30 may be disposed on the panel 12 before the polyurethane layer 20. Where the barrier material is TPU, the barrier layer 30 may be disposed on the panel on top of the polyurethane layer 20, as described in more detail hereinafter. The barrier layer 30 may allow the over rim coating 26 to be injected at greater fill pressures without a vacuum. As such, the panel 12 may be molded in its intended color, and therefore, does not need to be coated with a paint layer or sanded in preparation of such painting, thereby further simplifying the manufacturing process. The resulting structure 10 may be color matched to a customer's desired finishing. The barrier layer 30 may be liquid applied sealer, brushed, sprayed or roll coat applied to seal the surface adequately to prevent penetration of over rim material during the injection process, post applied to the panel 12 after it is formed or applied to panel forming tool and bonded as the panel 12 is formed. The liquid sealer generally may be compatible with both the materials used to form the panel 12 and the over rim materially, and do not degrade during processing.

Figure 3:
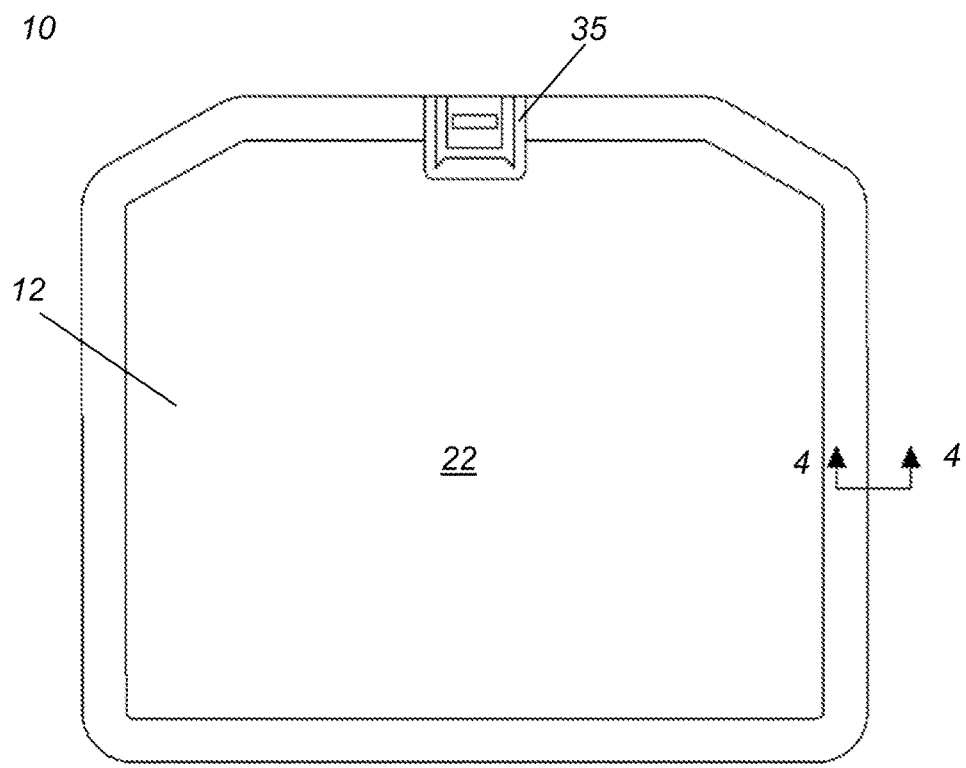
FIG. 3 is a top view of an exemplary load structure having an edge-wrapped configuration.
Figure 4:
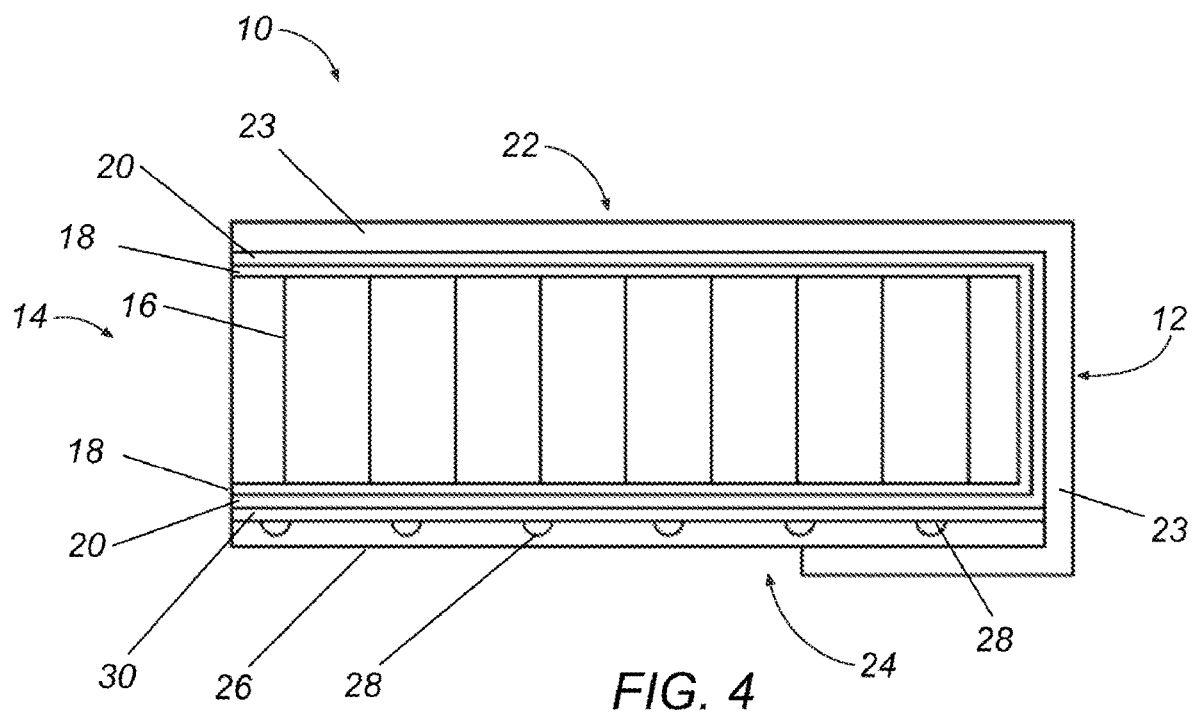
FIG. 4 is a partial cross-section through the load structure of FIG. 3 taken from the perspective of arrows 4-4.

In the injection process, it is desirable to have laminar flow and low pressure. Because polyurethane systems have a relatively high viscosity, they generally may be 2-part requiring high pressure impingement mixing, the cross-sectional area of the flow path may be relatively small, string gel times may be relatively short, and the available time to inject can be long in comparison. Resistance to flow can create significant back pressure at fill, which means, if the barrier layer is not adequate, some urethane may penetrate into the core. If this penetration occurs, a certain amount of air may be displaced, and may leak into the coating layer at a lower pressure area, causing an imperfection, such as a blister.

Where the load structure 10 has a non-edge-wrapped configuration such as illustrated in FIGS. 1 and 2, the load structure 10 may also include a fill passage 32 through the panel 12 from the first side 22 to the second side 24, as seen in FIG. 5. The fill passage 32 generally may be the passage through which the resin is injected to coat the second side 24 with the over rim coating 26. The fill passage 32 may be located within the footprint of the final load structure 10, for example, centrally located, as the carpet or felt layer 23 will cover the fill passage 32. Where the load structure 10 has an edge-wrapped configuration, as illustrated in FIGS. 3 and 4, the fill passage 32 may not be included in the final load structure, but rather may be located outside of the footprint that is trimmed and discarded after the injection process, as seen in FIG. 6, and described in more detail hereinafter. The fill passage 32 may be located in a space that is not where the material of carpet or felt 23 is located (see FIG. 6). In either configuration, the fill passage 32 may be tapered 33 from the second side 24 to the first side 22, as seen in FIG. 7. For example, the fill passage 32 may have a slope of 4 degrees with respect to an axis a of the fill passage 32.

In either configuration, the load structure 10 may further include a handle 35 or any other external feature attached to the panel 12. (See FIG. 12)

Figure 12:
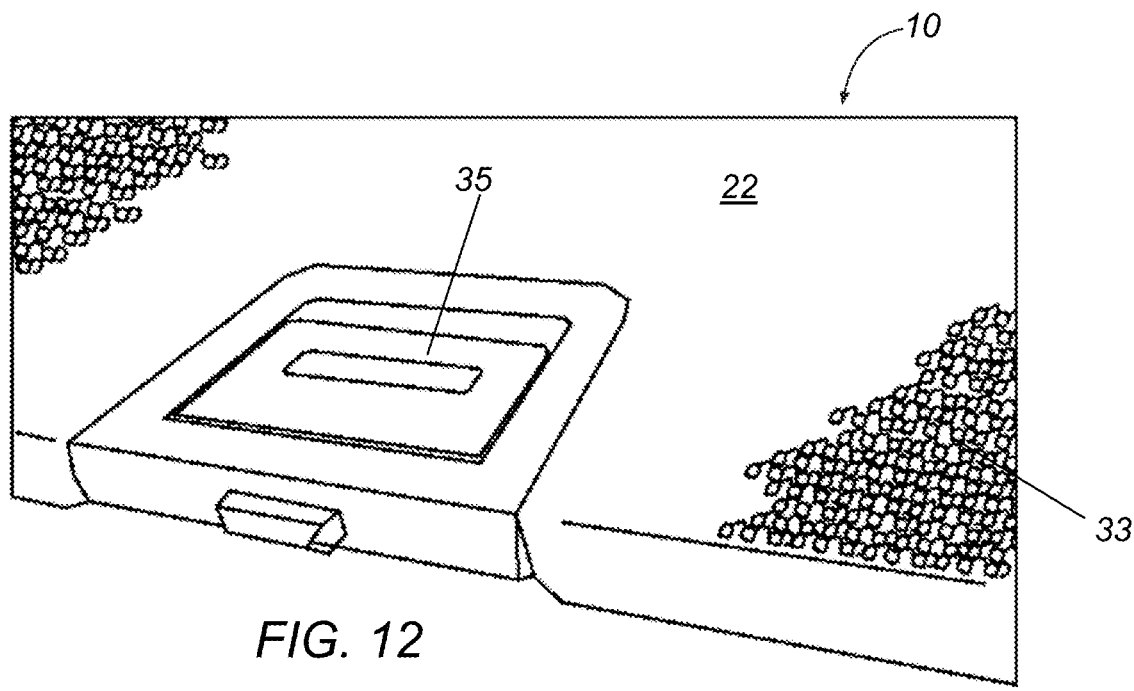
FIGS. 12 and 13 are partial perspective views of a top (or "A-side") and a bottom (or "B-side"), respectively, of an exemplary load structure.
Figure 13:
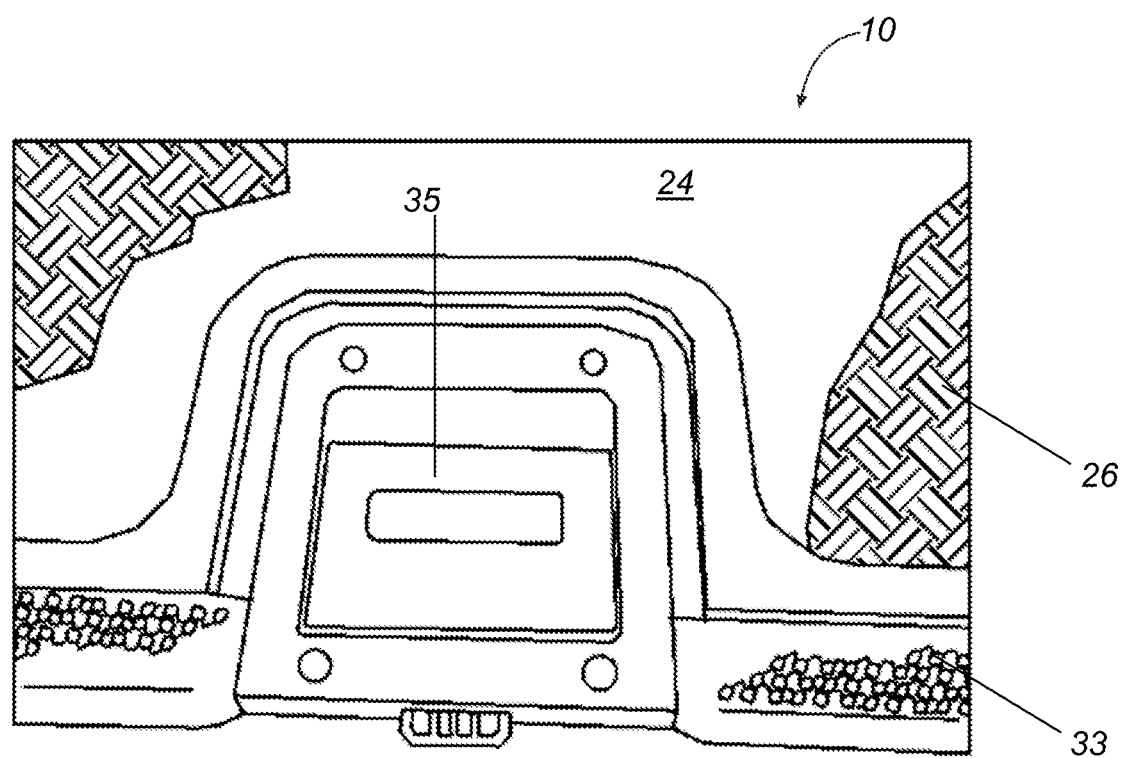

Referring now to FIGS. 12 and 13, the load structure 10 is shown in a perspective view depicting the FIG. 1 structure. In this embodiment, the load structure 10 is a releasable and repositionable vehicle member that can be located in the rear section of the vehicle whereby articles may be placed thereon. The load structure 10 is suited for accommodating dry, wet, heavy and light weight articles that may be placed thereon. The load structure 10 is operable to deflect minimally under wet and dry conditions. This is partially accomplished due to the reinforced honeycomb structure at the core of the load structure 10 coupled with the inclusion of the moisture impervious layer on at least one side (22 and/or 24) of the system. It will be appreciated that while FIGS. 12 and 13 show a moisture impervious layer on one side (side 24), that both sides may have a moisture resistant feature so as to enhance the integrity of the load structure 10. Thus, in one embodiment a unitary load structure 10 is provided that has a moisture impervious layer on one side, a consumer-friendly layer with carpet and the like on the other side, all combined with an improved core. Alternatively, a unitary load structure 10 may be provided that has a moisture impervious layer around the entire exterior surface (22, 24 and all sides and ports) in combination with an improved core. Thus, the load structure 10 may be sealed and provide a moisture impervious layer or feature about its entire exterior surface. Such structure would be highly impervious to moisture conditions thus making the load structure attractive for use with wet gear, swimming gear, fishing gear, hunting gear, skiing equipment, and the like. Also, for those consumers that tailgate at sporting events, a load structure 10 is provided that has a moisture resistant cleanable surface that can be easily cleaned up after events. For example, the load structure 10 may be removed from a vehicle and washed, dried and repositioned back into the vehicle. A handle, described herein, may be deployed to releasably permit the load structure 10 to be selectively detached form the vehicle. Thus, the load structure 10 is securable and lockable. It will be appreciated that the surface 24 may include a surface treatment that permits it to be more easily cleaned and sanitized for consumer use situations.

With continued reference to FIG. 12, it illustrates the first side 22 (or "A-side") and FIG. 13 illustrates the second side 24 (or "B-side"). As seen in FIG. 12, the first side 22 has a layer 33 of carpet or felt covering it. As seen in FIG. 13, the second side 24 may have an over rim coating 26 on at least a portion thereof, and a layer 33 of carpet or felt wrapped around an edge, though it should be appreciated that the second side 24 may have no carpet 33 wrapped around the edge. The load structure 10 has a handle 35 that may be accessible from either the first side 22 or the second side 24. This enables a user the option of having either the first side 22 or the second side 24 exposed, while still maintaining the functionality associated with the handle 35. Thus, the load structure 10 is reversible, symmetrically designed, resulting in a consumer being able to deploy a finished carpet like surface or a utilitarian like surface where dirty and wet articles can be placed on the load structure 10 without diminishing its integrity.

Figure 8:
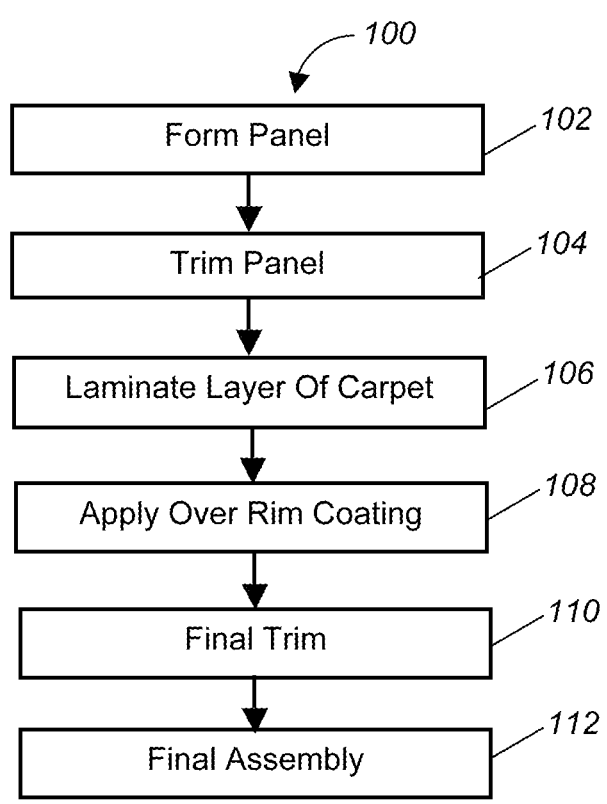
FIG. 8 is a schematic flow diagram of an exemplary process for manufacturing the load structure of FIGS. 1 and 2.

Referring now to FIG. 8, an exemplary process 100 for manufacturing a load structure 10 having a non-edge wrapped configuration, as illustrated in FIGS. 1 and 2, is shown. Process 100 may begin at step 102 in which the panel 12 may be formed. This step may involve transporting a core 14 of material, e.g., paper honeycomb 16 with a glass layer 18 around the honeycomb 16, from a load station to a spray cell. In one exemplary approach, such transporting may be done by a robot with an end of arm tool designed to grip the core 14 in a non-critical area. The core 14 may then be coated with a polyurethane layer 20 with a 2-part polyurethane system, with an amount adequate to encapsulate the glass and bond to the underlying paper honeycomb. The polyurethane may be spray-applied in an even layer over the surface of the core 14, with additional urethane applied where required to fill geometry.

The sprayed core 14 may then be placed into a heated mold. The mold which generally may have the basic geometry of the panel 12, including a footprint of the final load structure 10 and additional material to be trimmed later in process 100, as seen in FIG. 5. The basic geometry may also include one or more protrusions 28 on the second side 24 of the panel 12, as described above. The mold may then be closed for a duration long enough to cure the polyurethane and form the panel 12.

Step 102 may also include coating the panel 12 with a barrier material. As explained above, where the barrier material is glass, fiber, scrim, or paper, the barrier material may be disposed on the panel 12 before applying the polyurethane layer 20. Where the barrier material is TPU, the barrier material may be disposed on the panel on top of the polyurethane layer 20. For example, the TPU may be placed as a film within the mold prior to the core 14 being placed therein. Then, when the mold is closed and heated, the TPU may be applied, as described in more detail hereinafter. The mold generally may have the basic geometry of the panel 12, including the fill passage 32.

After step 102, process 100 may proceed to step 104 at which the panel 12 may be trimmed. After the polyurethane which created the structure and shape of the panel has cured, the part may be removed from the mold, conditioned, e.g., trimmed (about its perimeter and elsewhere as needed) in a second tool, and the fill passage 32 may be cleared. As seen in FIG. 6, the fill passage 32 may be located outside of the final footprint of the load structure 10.

After step 104, process 100 may proceed to step 106 at which the first side 22 of the panel 12 may be provided, e.g., laminated with carpet 23, felt, or a similar material. A piece of felt or carpet laminated to a TPU film having a thickness, for example, of 1.5-2.5 mm thick, may be cut larger than the footprint of the trimmed panel, for example, by an extended 10-13 mm from a perimeter of the panel footprint. The piece of felt or carpet may then be laminated to the side opposite of the side to be coated, overlapping the edge of the part by a certain amount, for example, by 10-13 mm. This may be accomplished by use of a reactive adhesive, including, but not limited to, polyurethane. The piece of felt or carpet, which generally may be rectangular shaped, may have four holes (one per corner) outside the perimeter of the part for use in locating in the over rim mold. However, it should be appreciated that it may have more or less holes, and further, that the geometry of the piece of felt or carpet may be any other polygonal and/or circular/curved shape.

Figure 10:
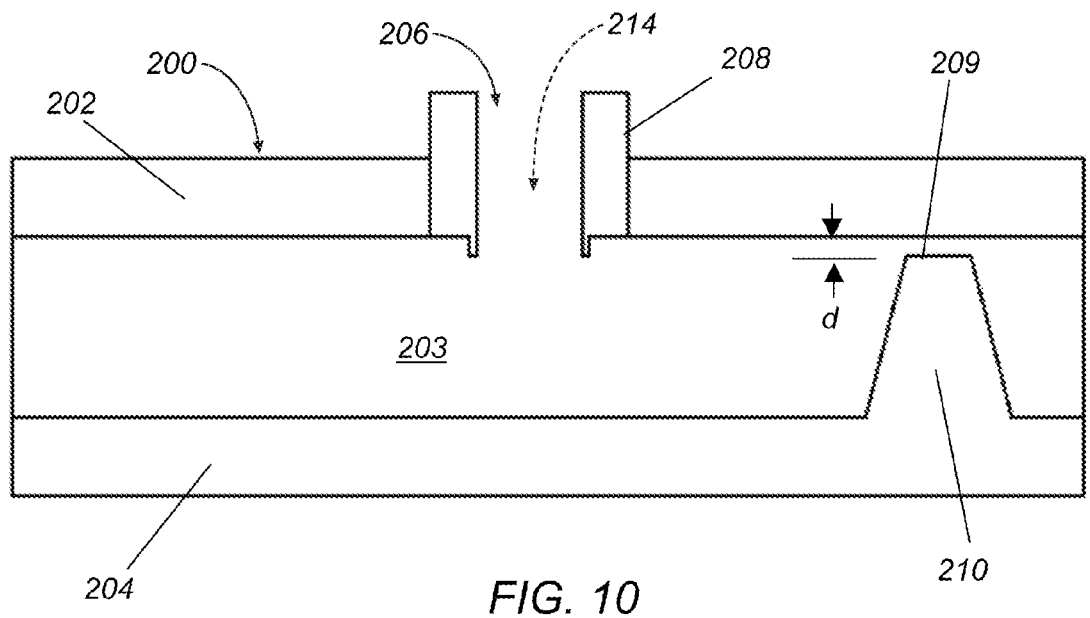
FIG. 10 is a schematic cross-section of an over mold tool used in the processes of FIGS. 5 and 6.
Figure 11:
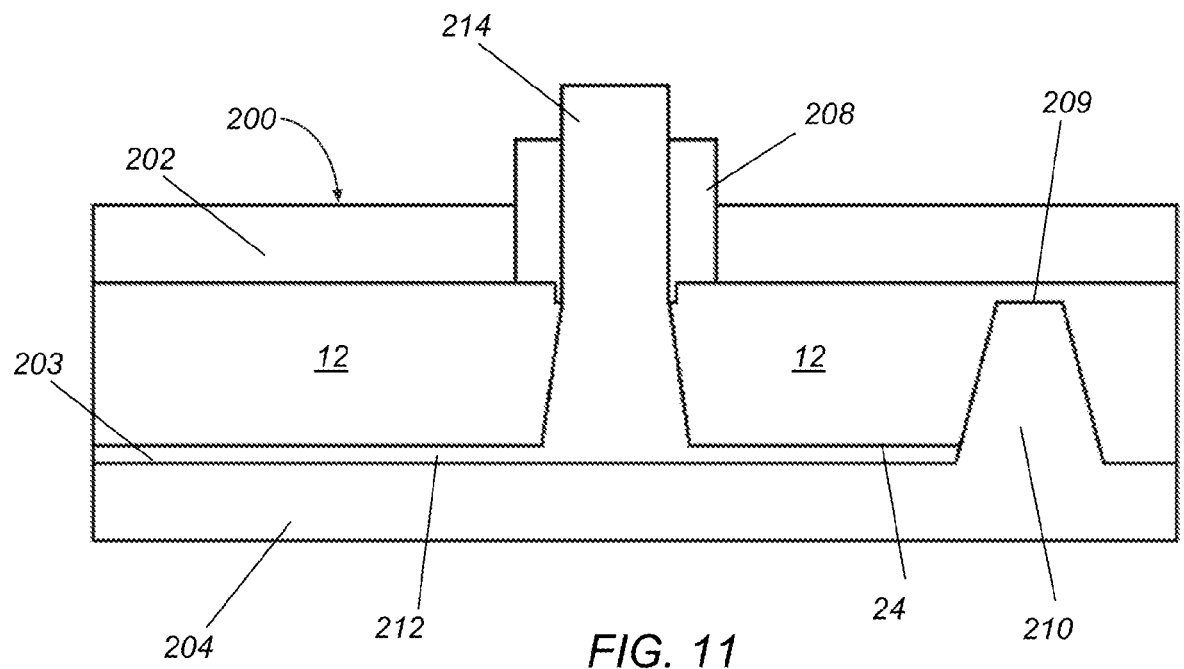
FIG. 11 is a schematic cross-section of the over mold tool of FIG. 7 with a panel inserted therein.

After step 106, process 100 may proceed to step 108 at which the panel 12 may be over rimmed, i.e., the over rim coating 26 may be applied to the second side 24 of the panel 12 as shown in FIG. 4. The over rimming may be performed by an over rim tool 200, as illustrated in FIGS. 10 and 11. Referring now to FIGS. 10 and 11, the over rim tool 200 may include an upper tool part 202 and a lower tool part 204 defining a cavity 203 therebetween when the over rim tool 200 is closed, in which the panel 12 is to be placed. The upper tool part 202 may include an opening or passage 206 through which an injection gun 208 may be inserted or fitted or otherwise attached to the upper tool part 202 for injecting the resin 214. The lower tool part 204 may include a projection 210 extending towards the upper tool part 202. When the over rim tool 200 is closed, an end 209 of the projection 210 may be spaced apart from the upper tool part 202 by a distance d, which may range from 0.5 mm to 4.0 mm.

The panel 12 may be placed in the cavity 203 of the over rim tool 200 with the first side 22 up, i.e., facing the upper tool part 202, and the second side 24 down, i.e., facing the lower tool part 202. When the over rim tool 200 is closed, as illustrated in FIG. 11, the projection 210 may pinch or seal the panel 12 against the upper tool part 202 such that there may be a gap 212 between the second side 24 of the panel 12 and the lower tool part 204. The gap 212 generally may define the thickness of the over rim coating 26 and may have the same dimension as the distance d between the end 209 of the projection 210 and the upper tool part 202. The excess carpet or carpet flange may be tramped between the upper and lower tool parts 202, 204, forming a seal around the perimeter of the part, except those locations where venting may be required, allowing air being displaced by the over rim coating 26 to escape.

Once the panel 12 is secured in the over rim tool 200, the resin 214 may be injected via the injection gun 208 through the fill passage 32 in the panel 12 until the gap 212 is filled. The fill pressure at which the resin 214 may be injected generally may be dependent upon such factors, including, but not limited to, gel time of the resin 214 and the amount of resin 214 needed for the over rim coating, and may range, for example, from 2 bar to 200 bar.

After step 108, process 100 may proceed to step 110 at which the panel 12 may undergo final trimming. The panel may be removed from the mold and placed in a second trim tool, which may be designed to remove any excess carpet flange and fill location to the final footprint of the load structure 10.

Process 100 may end after step 112 during which the panel may undergo final assembly, for example, by attaching a handle, hardware or other external feature(s) to the panel.

Figure 9:
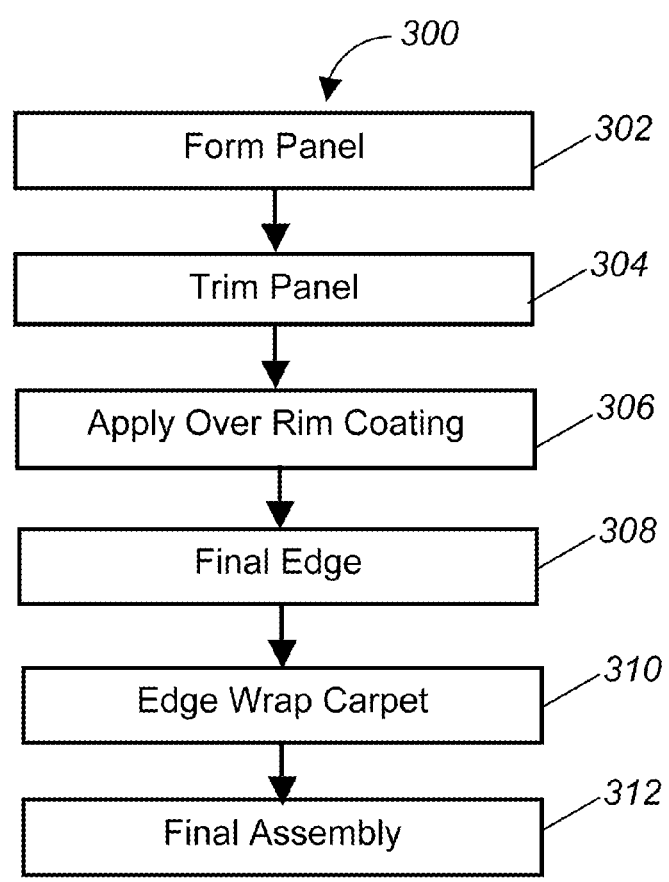
FIG. 9 is a schematic flow diagram of an exemplary process for manufacturing the load structure of FIGS. 3 and 4.

Referring now to FIG. 9, an exemplary process 300 for manufacturing a load structure 10 having an edge-wrapped configuration, as illustrated in FIGS. 3 and 4, is shown. Process 300 may begin at step 302 in which the panel 12 may be formed. This step may involve transporting a core 14 of material, e.g., paper honeycomb 16 with a glass layer 18 around the honeycomb 16, from a load station to a spray cell. In one exemplary approach, such transporting may be done by a robot with an end of arm tool designed to grip the core 14 in a non-critical area. The core 14 may then be coated with a polyurethane layer 20 with a 2-part polyurethane system, with an amount adequate to encapsulate the glass and bond to the underlying paper honeycomb. The polyurethane may be spray-applied in an even layer over the surface of the core 14, with additional urethane applied where required to fill geometry.

The sprayed core 14 may then be placed into a heated mold. The mold which generally may have the basic geometry of the panel 12, including a footprint of the final load structure 10 and additional material to be trimmed later in process 300. The basic geometry may also include one or more protrusions 28 on the second side 24 of the panel 12, as described above. The mold may then be closed for a duration long enough to cure the polyurethane and form the panel 12.

Step 302 may also include coating the panel 12 with a barrier material. As explained above, where the barrier material is glass, fiber, scrim, or paper, the barrier material may be disposed on the panel 12 before applying the polyurethane layer 20. Where the barrier material is TPU, the barrier material may be disposed on the panel on top of the polyurethane layer 20. For example, the TPU may be placed as a film within the mold prior to the core 14 being placed therein. Then, when the mold is closed and heated, the TPU may be applied, as described in more detail hereinafter. The mold generally may have the basic geometry of the panel 12, including the fill passage 32.

After step 302, process 300 may proceed to step 304 at which the panel 12 may be conditioned, e.g., trimmed. After the polyurethane which created the structure and shape of the panel has cured, the part may be removed from the mold, trimmed (perimeter) in a second tool, and the fill passage 32 may be cleared. As seen in FIG. 5, the fill passage 32 may be located within the final footprint of the load structure 10.

After step 304, process 300 may proceed to step 306 at which the panel 12 may be over rimmed, i.e., the over rim coating 26 may be applied to the second side 24 of the panel 12. The over rimming may be performed by an over rim tool 200, as illustrated in FIGS. 10 and 11. The panel 12 may be placed in the cavity 203 of the over rim tool 200 with the first side 22 up, i.e., facing the upper tool part 202, and the second side 24 down, i.e., facing the lower tool part 202. When the over rim tool 200 is closed, as illustrated in FIG. 11, the projection 210 may pinch or seal the panel 12 against the upper tool part 202 such that there may be a gap 212 between the second side 24 of the panel 12 and the lower tool part 204. The gap 212 generally may define the thickness of the over rim coating 26 and may have the same dimension as the distance d between the end of the projection 210 and the upper tool part 202.

Once the panel 12 is secured in the over rim tool 200, the resin 214 may be injected via the injection gun 208 through the fill passage 32 in the panel 12 until the gap 212 is filled. The fill pressure at which the resin 214 may be injected generally may be dependent upon such factors, including, but not limited to, gel time of the resin 214 and the amount of resin 214 needed for the over rim coating, and may range, for example, from 2 bar to 200 bar.

After step 306, process 300 may proceed to step 308 at which time the panel 12 may undergo final trimming. The panel may be removed from the mold and placed in a second trim tool, which may be designed to remove any excess material, i.e., the material beyond the footprint of the load structure 10, including where the fill passage 32 is located.

After step 308, process 300 may proceed to step 310 at which the edge may be wrapped. A piece of carpet die-cut to a specific shape may be attached to the first side 22 of the panel 12 and wrapped around the edges of the panel 12 to the second side 24 at least partially along a perimeter of the panel 12, ending after overlapping a portion of the over rim coating 28.

Process 300 may end after step 312 during which the panel may undergo final assembly, for example, by attaching a handle or other external feature to the panel.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments and should in no way be construed so as to limit the claims.

Referring now to FIGS. 14-16, a vehicle component 400 according to one exemplary approach is illustrated. While the vehicle component 400 is illustrated as a storage compartment, for example, in a trunk of a vehicle, it should be appreciated that the vehicle component may be any other component in a vehicle. The vehicle component 400 generally may have a front trim member 402, a rear trim member 404, and side walls 406 therebetween that define a compartment 408. The front and rear trim members 402, 404 may allow the vehicle component 400 to be installed within a vehicle, not shown. The vehicle component 400 may also include a divider wall 412 that may divide the compartment 408 into sub-compartments $408_1$ and $408_2$. It should be appreciated that there may be multiple divider walls 412 that divide the compartment 408 into more than two sub-compartments, and further that the sub-compartments may be the same or different size, shape, and/or configuration depending upon the location and orientation of the divider wall(s) 412.

The vehicle component 400 may further include a stowable repositionable cover 410 configured to cover all or portions of the compartment 408. The stowable cover 410 may be a load structure 10, as described above, and may have an edge-wrapped configuration or a non-edge wrapped configuration. The stowable cover 410 may be movable from a closed position, as illustrated in FIG. 14, to an open position as is shown in FIG. 15, to a fully deployed position (as shown in FIG. 16) in which the cover 410 may be elevated in the air and substantially level so that it may be usable as a shelf or platform. Thus, the component 400 can be a locatable shelf that can be stowed in the vehicle. The side walls 406 and the front trim member 402 generally may include a mating edge 414, which may be depressed such that the cover 410 may sit flush with the front trim member 402 and/or the rear trim member 404. The cover 410 may be attached to each side wall 406 via a pivoting mechanism 416, which may include, but is not limited to, a hinge 418 and an extension member 420 connecting the hinge 418 and the cover 410. The pivoting mechanism 416 generally may enable the cover 410 to rotate from the closed position, as seen in FIG. 14, to a deployed position as is shown in FIG. 16. As further seen in FIG. 14, the vehicle component 400 may include a rear transversely extending channel 422 into which a rear edge 424 of the cover 410 may rotate into. The extension member 420 may have a latch at one end for securing the cover 410 into the horizontal position shown in FIG. 16. This construction provides a secure table-like construction for a consumer to place articles thereon, such as for example, when tailgating at a sporting event. The cover 410 may further be rotatably connected to the extension member 420 such that it may rotate out into the deployed position (FIG. 16) to the stored position as is shown in FIG. 14.

Figure 17:
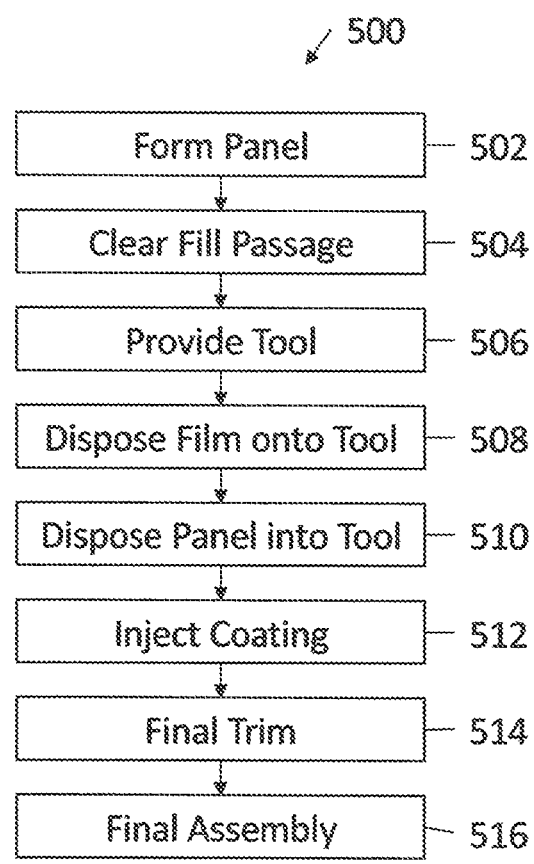
FIG. 17 is a schematic flow diagram of another exemplary process for manufacturing a load structure, with this process using a film.

Referring now to FIG. 17, an exemplary process 500 for manufacturing a load structure 10 using a film is shown. The process 500 may include, but is not limited to, forming a panel 502, clearing a fill passage 504, providing a tool 506, disposing film onto the tool 508, disposing or placing a panel into the tool 510, injecting a coating (resin) 512 into a cavity of the tool, conducting a final trim process 514 to remove excess material, and providing a final assembly 516 such as adding hardware, etc. It will be appreciated the other steps may be deployed. Process 500 may begin at step 502 in which a panel 12 is formed. Step 502 may be substantially similar to step 102 of process 100 and/or step 302 of process 300. For instance, the panel 12 of process 500 may be formed in a similar manner as described in process 100 and/or process 300.

Figure 20:
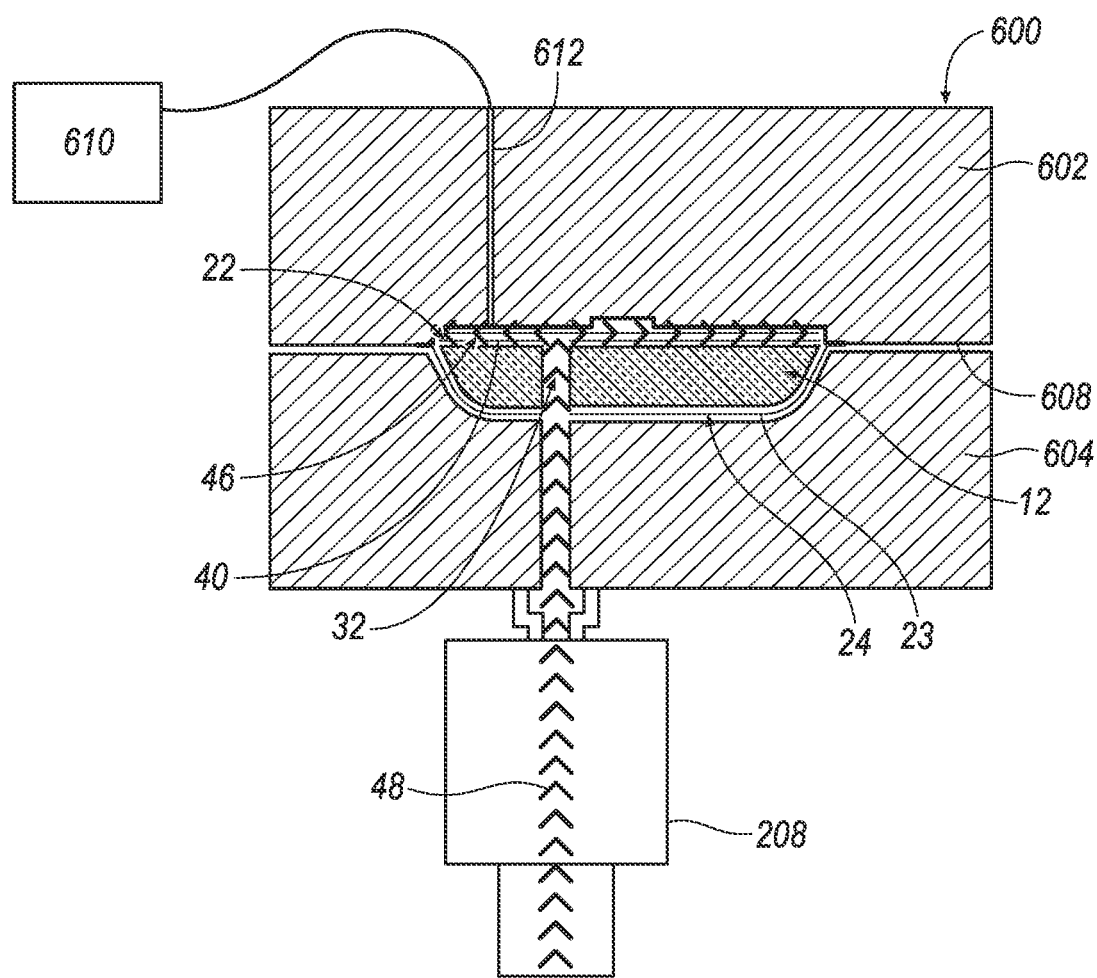
FIG. 20 is a schematic cross-section of a panel disposed within the tool of FIG. 18.

After step 502, process 500 may proceed to step 504 in which the panel 12 may be trimmed and/or a fill passage 32 may be cleared. As illustrated in FIG. 20, the fill passage 32 may be cleared all of the way through the panel 12. For instance, the fill passage 32 may extend from a second side 24 of the panel 12 to a first side 22 of the panel 12. The fill passage 32 may be tapered from a first side to the second side as is shown in FIG. 7. Step 504 may be substantially similar to step 104 of process 100 and/or step 304 of process 300. For instance, the panel 12 of process 500 may be trimmed and/or the fill passage 32 cleared in a similar manner as described in process 100 and/or process 300.

In some example configurations, after step 504, another step 505 (not shown) may be provided wherein the panel 12 may be provided with, e.g., laminated with felt 23, carpet, or a similar material. The felt 23 may be provided to the first side 22 and/or the second side 24 of the panel 12. The felt 23 may be applied to the panel 12 in a similar manner as in step 106 of process 100.

Figure 18:
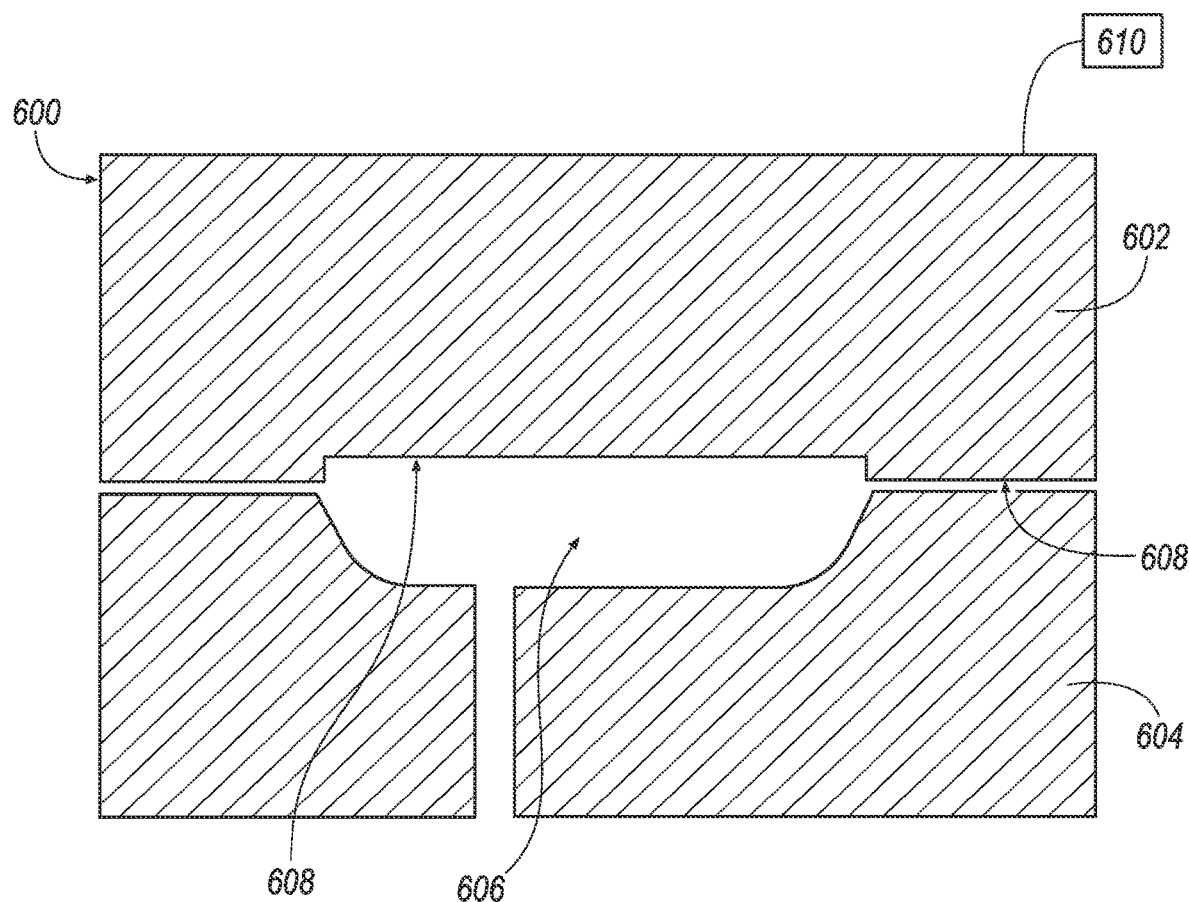
FIG. 18 is a schematic cross-section of a tool used in the process of FIG. 17.

The next step of process 500 may include providing a tool 506 (e.g., an over rim tool 600). In some instances, the tool 600 may be similar to over rim tool 200. Referring now to FIG. 18, the tool 600 may include a first portion 602 (e.g., an upper tool part) and a second portion 604 (e.g., a lower tool part) defining a cavity 606 therebetween when the tool 600 is closed, in which the panel 12 is to be placed. The first portion 602 of the tool 600 includes a surface 608 that faces and/or opposes the second portion 604 of the tool 600. In some example configurations, the first portion 602 of the tool 600 may operate at a first temperature and the second portion 604 of the tool 600 may operate at a second temperature, and the first temperature may be greater than the second temperature. For example, and without limitation, the first temperature may be approximately 180° F. and the second temperature may be approximately 150° F. In some instances, the first temperature may be less than or greater than 180° F. and the second temperature may be less than or greater than 150° F. The surface 608 of the tool 600 may have contoured aspects, logos, names, undulations, texture, etc., that may be in turn be imprinted onto the exterior surface of the resulting load structure that is fabricated as a result of process 500.

Figure 19:
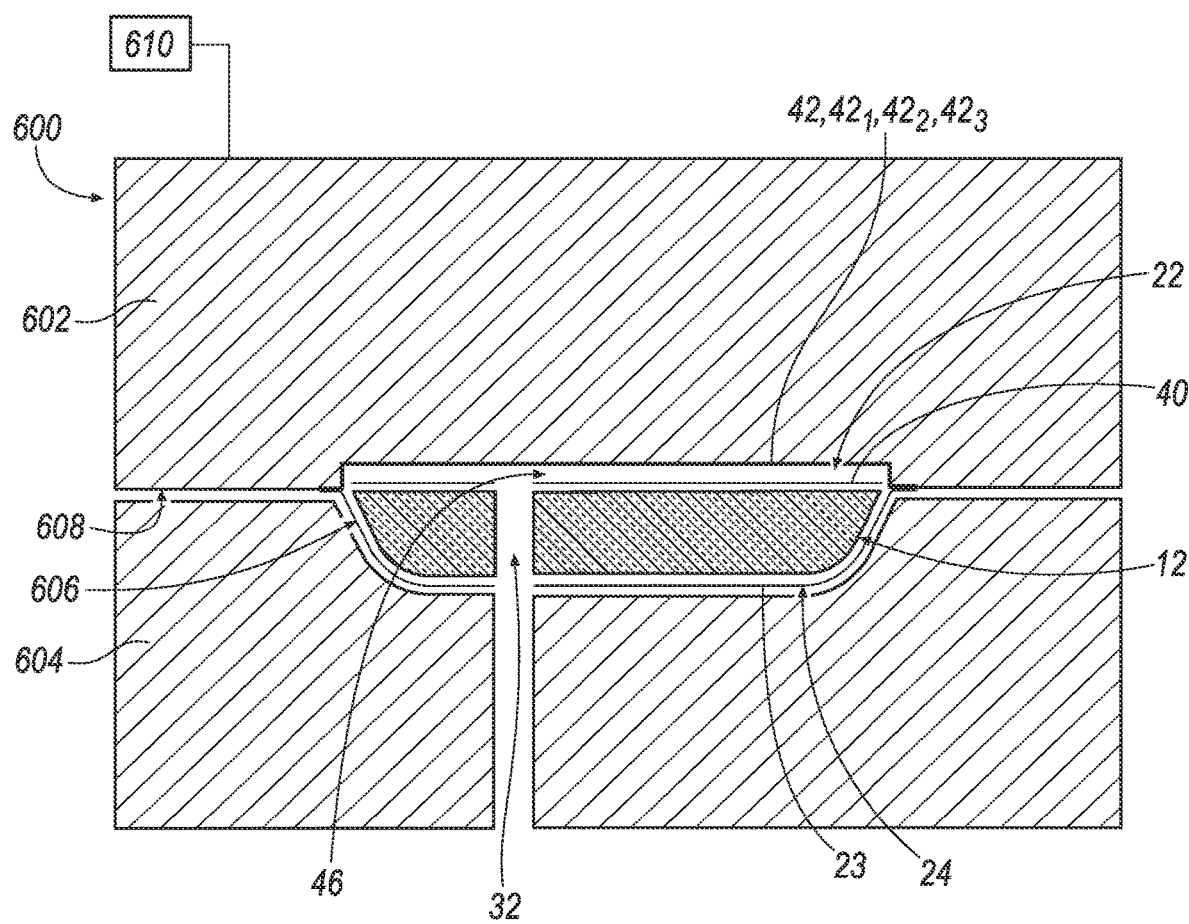
FIG. 19 is a bottom view of a portion of the tool of FIG. 18.

Referring now to FIG. 19, after step 506, process 500 may proceed to step 508 in which a film 42 is located or otherwise disposed onto/into tool 600. In particular, the film 42 is positioned onto the surface 608 of the first portion 602 of the tool 600. The film 42 may extend along surface 608 such as to substantially cover the cavity 606 of the tool 600. In some instances, the film 42 may cover only a portion of surface 608 or the film 42 may cover approximately the entire surface 608. Various methods may be utilized such that the film 42 is accurately disposed onto the tool 600. For example, the film 42 may be indexed off into segments and then disposed onto the tool 600, the film 42 may be pulled from a roll of film and then disposed onto the tool 600, and/or the film 42 may be framed and then disposed onto the tool 600, among others. The film 42 may be selectively applied to limited portions or areas of the surface 608.

In some example configurations, the tool 600 may include and/or may be connected to a vacuum system 610. In particular, the first portion 602 of the tool 600 may include and/or may be connected to the vacuum system 610 that provides a negative pressure through a channel or port 612 that extends through the cross section of the first portion 602 (see FIG. 20). The vacuum system 610 is configured to secure the film 42 to the first portion 602 of the tool 600 (e.g., surface 608). For instance, the vacuum system 610 is configured to produce a negative pressure that secures the film 42 to the tool 600. The vacuum system 610 is configured to remove air, dust, and/or any additional impurities from an area between the film 42 and surface 608. The vacuum system 610 is configured to remove wrinkles from the film 42. It will be appreciated that other means or systems may be deployed in order to locate the film 42 in position relative to the surface 608 and hold the film 42 in place during the process 500.

The film 42 may include various shapes, sizes, colors, and/or configurations. For example, and without limitation, the film 42 may include a thickness in a range of approximately 0.002 to 0.01 inches. In some examples, the film 42 may include a thickness of greater than 0.01 inches. The film 42 may comprise a thermal plastic polyurethane material or any other suitable material. The film 42 may comprise a thermal plastic polyurethane aliphatic material that is configured to provide solar and/or UV degradation resistance. The film 42 may include a soft or a hard durometer. A purpose of the film 42 is to provide a cosmetic layer to a surface of the panel, connected by the transitional layer of polyurethane to the honeycomb substrate, while forming to the contours, grain, features of the tool.

With continued reference to FIGS. 17 and 19, step 508 may include disposing one or more layers of film 42 onto the tool 600. In some examples, a first film layer $42_1$ and a second film layer $42_2$ may be disposed onto surface 608. The first film layer $42_1$ and the second film layer $42_2$ may include one or more similar characteristics (e.g., color, thickness, material, etc.). The first film layer $42_1$ and the second film layer $42_2$ may include one or more different characteristics. In other examples, a plurality of film layers may be disposed onto surface 608, such as a first film layer $42_1$, a second film layer $42_2$, and a third film layer $42_3$. In some instances, as many as 6 film layers may be disposed onto the tool 600. The surface 608 extends along a horizontal plane and it will be appreciated that first film layer $42_1$ and a second film layer $42_2$ may be disposed at different locations on the horizontal plane of surface 608. Thus, different films 42 can be positioned at different locations along the surface 608 which will result in a load panel being formed that has different surface characteristics once it has been molded.

After step 508, process 500 may proceed to step 510 in which the panel 12 is disposed or otherwise loaded into the cavity 606 of the tool 600. See FIG. 19. The panel 12 may be positioned in the cavity 606 such that the second side 24 of the panel 12 engages and/or faces the second portion 604 of the tool 600 and the first side 22 of the panel 12 faces the first portion 602 of the tool 600. In some examples, the felt layer 23 of the second side 24 of the panel 12 may contact the second portion 604 of the tool 600. The temperature (e.g., the second temperature) of the second portion 604 of the tool 600 is selected such that the felt layer 23 is not damaged during operation of the tool 600. Thus, the tool's temperature may be adjusted and/or programmed to accommodate the felt layer 23 so as to prevent any damage to the felt layer 23. For example, and without limitation, the second temperature may be approximately 150° F. When the tool 600 is closed, as illustrated in FIG. 19, the first side 22 of the panel 12 is spaced apart from the surface 608 and the film 42 defining a void 46.

Referring now to FIG. 20, after step 510, the process 500 may proceed to step 512 in which a coating 48 (e.g., a resin) is injected via the injection gun 208. The coating 48 is injected through the fill passage 32 of the panel 12 until the void 46 (e.g., the space between panel 12 and film 42) is filled. In some example configurations, the coating 48 may comprise a polyurethane material. The fill pressure at which the coating 48 may be injected generally may be dependent upon such factors, including, but not limited to, cure time of the coating 48 and the amount of coating 48 needed to fill the void 46, and may range, for example, from 2 bar to 200 bar. The coating 48 may be configured to cure (e.g., harden) quickly, for example and without limitation, in approximately 15 minutes or less. The film 42 is configured to adhere to the first side 22 of the panel 12 subsequent to the void 46 being filled. Thus, the film 42 is released from and does not adhere to the surface 608 after step 512 is completed. The film 42 becomes the outer completed finished surface 61 (see FIG. 23) of the completed load structure 10 that results from the process 500 as is shown in FIG. 24.

In some examples, prior to the coating 48 being injected, a paper layer 40 may be disposed onto the first side 22 of the panel 12. The paper layer 40 may cover a portion of the first side 22 of the panel 12 or the paper layer 40 may cover approximately the entire first side 22 of the panel 12. The paper layer 40 is disposed such that the void 46 is arranged between the film 42 and the paper layer 40. A purpose of the paper layer 40 is to is to provide a barrier which prevents the pressurized polyurethane from penetrating the glass/polyurethane layer of the honeycomb structure. This barrier layer can be paper, film, fiber, or other materials configured to prevent penetration in to core of the honeycomb panel.

Figure 21:
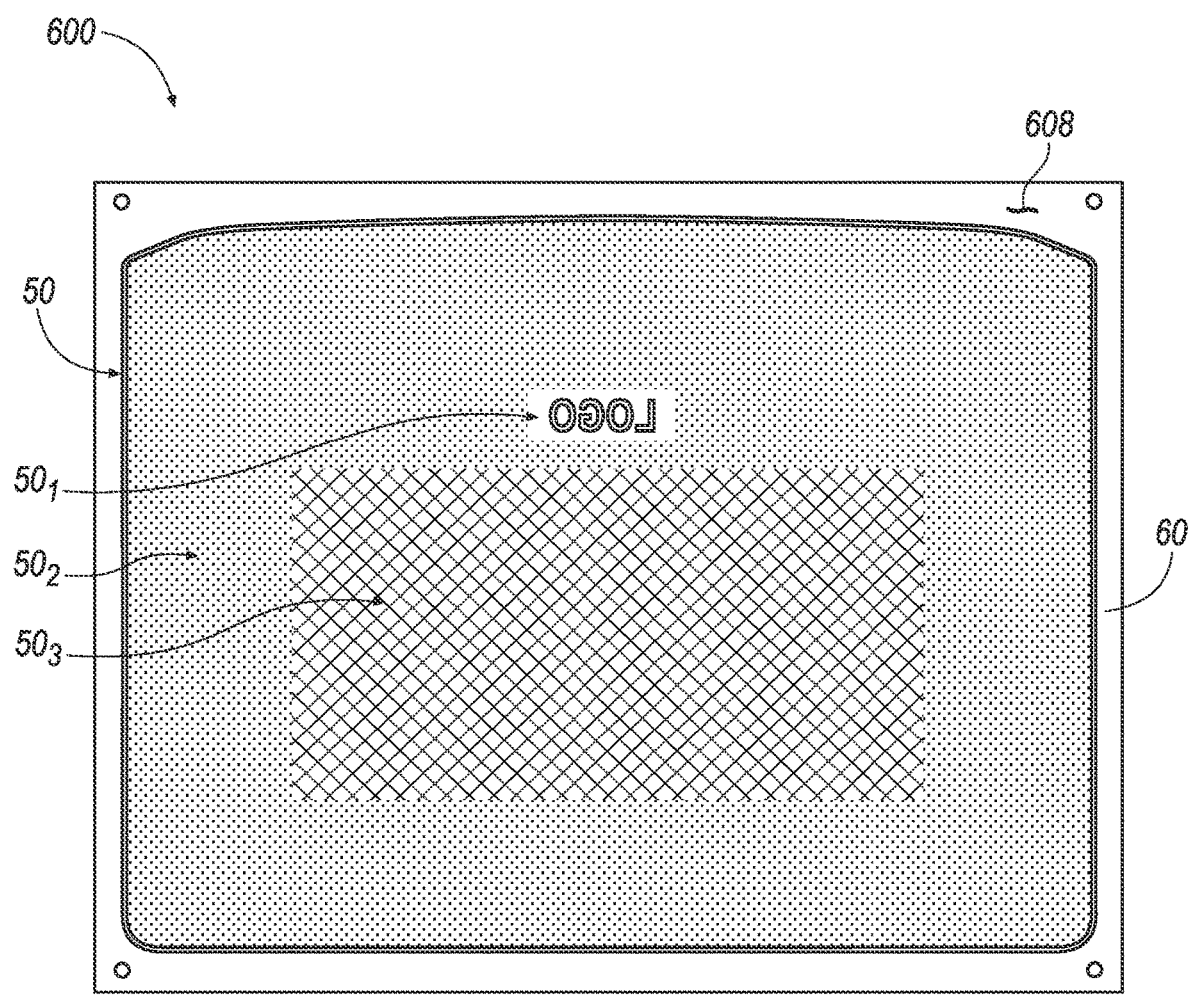
FIG. 21 is a schematic cross-section of operations of the tool of FIG. 18, showing resin flowing into the mold.
Figure 22:
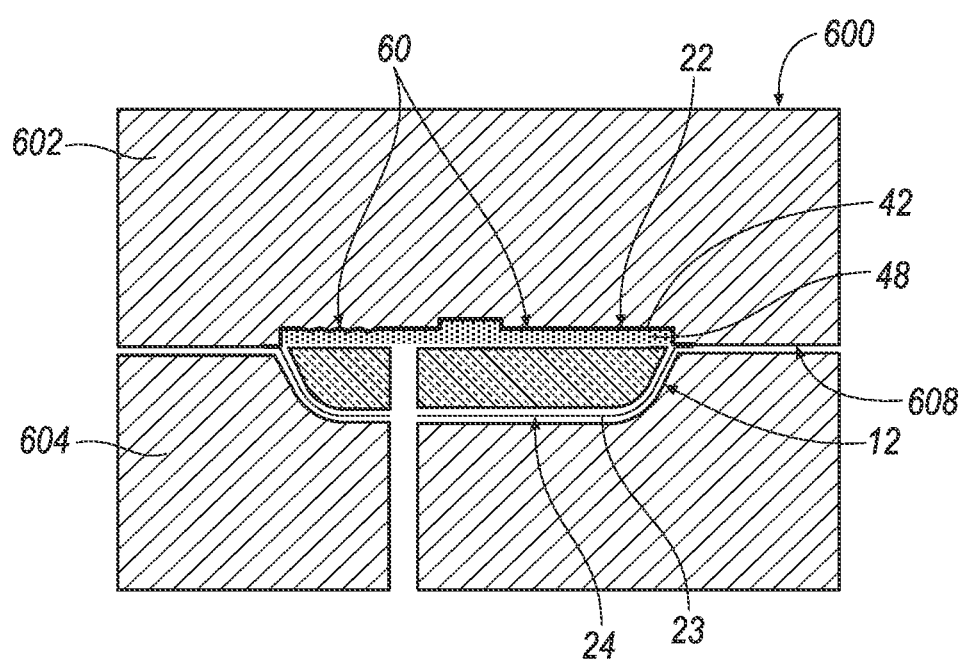
FIG. 22 is a schematic cross-section of the load structure having been formed in the tool, as a result of the operations of FIG. 21.
Figure 23:
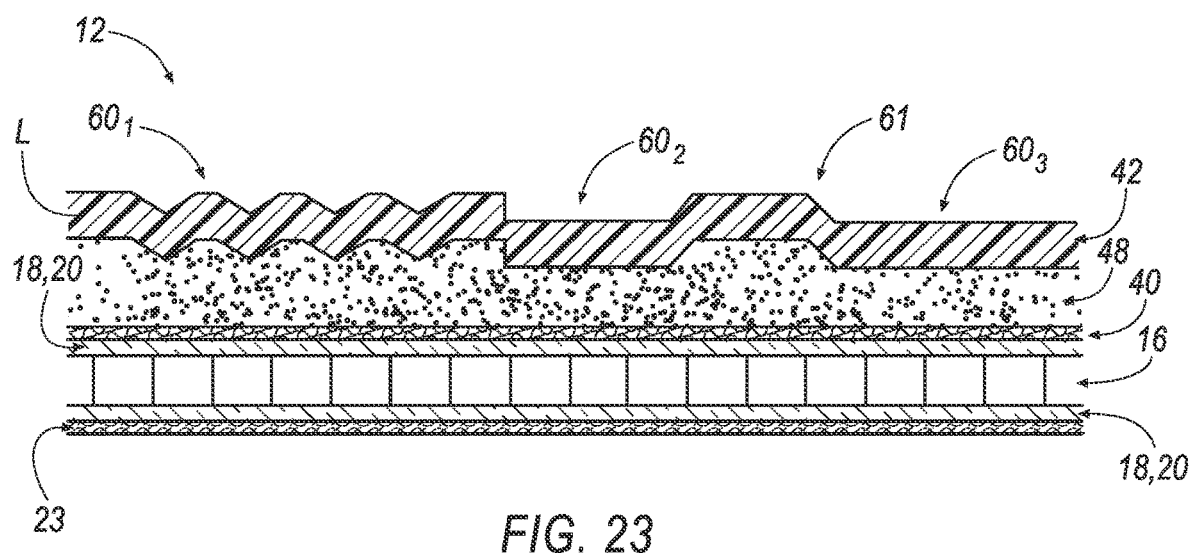
FIG. 23 is a schematic cross-section of the layers of a load structure after completion of the operations of FIGS. 21 and 22.
Figure 24:
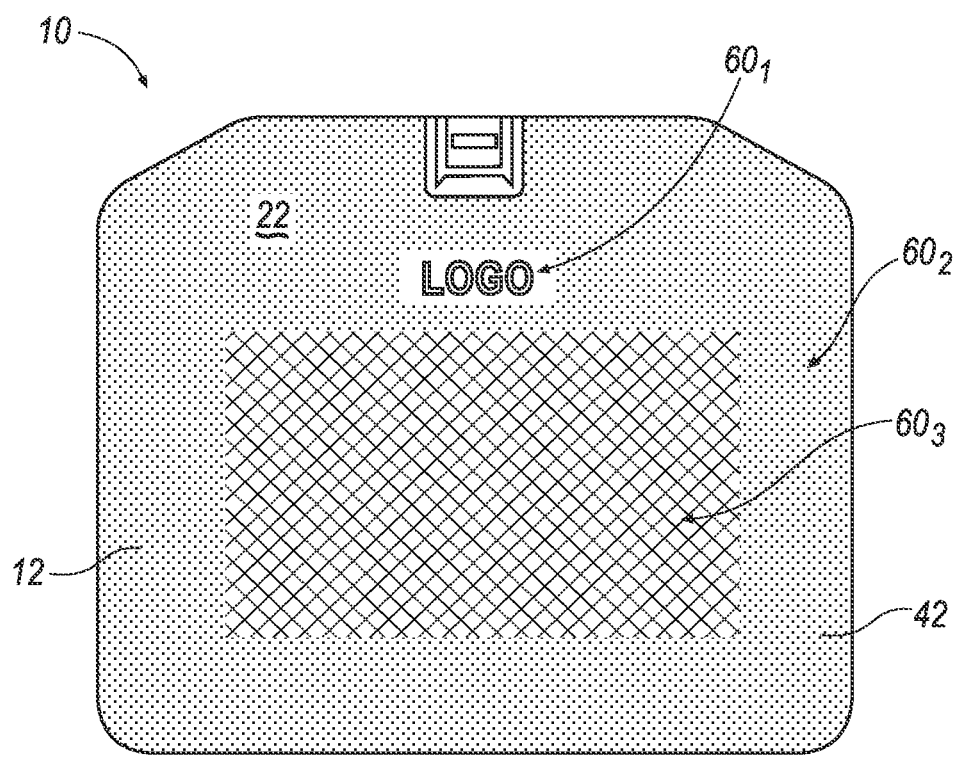
FIG. 24 is a top view of an exemplary load structure.

Referring now to FIGS. 21 and 23, FIG. 21 shows a top view of the surface of the tool 600 looking along the plane 60 that we see in the side sectional view of FIG. 22. Here, the first portion 602 of the tool 600 may include one or features 50 that are configured to imprint one or more indicia (e.g., a logo, a name, a pattern, a grain, a number, a letter, and/or a symbol, among others) into the film 42 which results in the imprint of the features 50 to be transferred to the panel 12. This would occur, for example, during step 512. For instance, it may be desirable for the show surface (e.g., first side 22) of a completed load structure 10 (see, e.g., FIG. 24) to include a company's logo, a decorative pattern, and/or a decorative grain.

The features 50 extend from the surface 608 in a direction towards the panel 12 such as to engage the film 42. The features 50 extend and are part of the surface 608. For example, and without limitation, the features 50 may extend from the surface 608 by a distance that is substantially equal to the thickness of the film 42. For instance, the features 50 may extend from the surface 608 by a distance that is in a range of approximately 0.002 to 0.01 inches. In some examples, the features 50 may extend from the surface 608 by a distance that is greater than 0.01 inches. While the coating 48 is being injected, the fill pressure of the coating 48 causes the film 42 to be pressed into the surface 608 and the features 50 such that the one or more indicia are imprinted into the film 42.

With continued reference to FIGS. 21 and 22, the features 50 are customizable and may include various shapes, sizes, and configurations dependent upon the desired final appearance of the load structure 10. For example, and without limitation, the features 50 may include a first plurality of features $50_1$, a second plurality of features $50_2$, and/or a third plurality of features $50_3$, among others, or more. The first plurality of features $50_1$ may be arranged to imprint a company's logo into the film 42 which in turn is transferred to the panel 12. The second plurality of features $50_2$ may be arranged to imprint a decorative grain into the film 42 and then onto the panel 12. The third plurality of features $50_3$ may be arranged to imprint a decorative pattern such as cross hatches, diamond plate, etc., into the film 42 and then to the panel 12. Thus, any arrangement of features 50 may be provided on the surface 608.

Referring to FIGS. 22 and 24, FIG. 23 shows the molded panel 12 still in the tool 600, while FIG. 23 shows a schematic diagram of the layers of a molded panel 12 shown post step 512. The film 42 is secured to the panel 12 and is arranged as an outer layer L of the panel 12. The coating 48 of resin is disposed between the film 42 and the paper layer 40. One or more indicia 60 such as $60_1$, $60_2$, and $60_3$ (e.g., a logo, a pattern, a grain, a number, a letter, and/or a symbol, among others) may be disposed within the show surface 61 (e.g., first side 22) of the panel 12.

In some examples, the film 42 may be opaque and/or may include a color such the coating 48 is not visible through the film 42. In some examples, the film 42 may be configured such that release agents are not required to remove the panel 12 from the tool 600. The film 42 is configured such that a non-stick material/release agent is not required to be used in the tool 600 and/or the tool 600 does not required to be cleaned between operation cycles. Thus, the use of film 42 may provide the advantage of saving the cost of using any release agent and the manpower to apply same. Such will reduce per part cost.

After step 512, the process 500 may proceed to step 514, in which the panel 12 may undergo final trimming. The panel 12 may be removed from the tool 600 and placed in an additional trim tool, which may be designed to remove any excess material such that the panel 12 is trimmed to the final footprint of the load structure 10. For instance, the panel 12 of process 500 may be trimmed in a similar manner as described in process 100 and/or process 300.

After step 514, the process 500 may proceed to step 516, during which the panel 12 may undergo final assembly, for example, by attaching a handle, hardware, or other external feature(s) to the panel 12. For instance, the panel 12 of process 500 may undergo final assembly in a similar manner as described in process 100 and/or process 300.

Referring now to FIG. 24, a completed load structure 10 manufactured by process 500 is shown. The load structure 10 includes a plurality of indicia 60 that are disposed within the show surface (e.g., first side 22) of the structure, such as a first indicia $60_1$, a second indicia $60_2$, and a third indicia $60_3$. The first indica $60_1$ includes a company's logo. The second indicia $60_2$ includes a decorative grain. The third indica $60_3$ includes a decorative pattern.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method of manufacturing a load structure, the method comprising:
   forming a panel having a first side and a second side;
   clearing a fill passage through the panel, the fill passage extending from the second side to the first side;
   providing a tool having a first surface portion, a second surface portion, and a cavity disposed between the first and second surface portions;
   disposing a film onto a surface of the first surface portion of the tool;
   disposing the panel within the cavity such that the second side of the panel engages the second surface portion of the tool, and the first side of the panel is spaced apart from the first surface portion of the tool defining a void;
   injecting a coating through the fill passage such that the coating fills the void and the film adheres to the first side of the panel; and
   prior to injecting the coating, disposing a paper layer over the first side of the panel such that the void is arranged between the film and the paper layer.

2. The method of claim 1, wherein the surface of the first surface portion of the tool includes one or more features that are configured to imprint one or more indicia into the film.

3. The method of claim 2, wherein the indicia include one or more of a logo, a pattern, a grain, a number, a letter, or a symbol.

4. The method of claim 1, wherein the first surface portion of the tool includes one of a vacuum or a port;
   the film is secured to the first surface portion of the tool via a negative pressure that is applied to the port; and
   the vacuum is configured to remove at least one of air, dust, or other impurities from an area between the film and the first surface portion of tool.

5. The method of claim 1, wherein the film includes a thickness in a range of approximately 0.002 to 0.01 inches.

6. The method of claim 1, wherein the film comprises a thermal plastic polyurethane material.

7. The method of claim 1, wherein the first surface portion of the tool is configured to operate at a first temperature;
   the second surface portion of the tool is configured to operate at a second temperature; and the first temperature is greater than the second temperature.

8. The method of claim 7, wherein the panel includes a felt layer positioned on the second side of the panel that engages the second surface portion of the tool; and
   the second temperature is selected such that the felt layer is not damaged by the second surface portion of the tool.

9. The method of claim 1, wherein the coating comprises a polyurethane material; and the coating is configured to cure within 15 minutes or less in the tool.

10. The method of claim 1, wherein disposing a film onto a surface of the first surface portion of the tool includes disposing a first film layer and a second film layer onto the surface of the first surface portion of the tool.

11. The method of claim 10, wherein the first film layer and the second film layer include one or more similar characteristics.

12. The method of claim 10, wherein the first film layer and the second film layer include one or more different characteristics.

13. The method of claim 1, wherein disposing a film onto the first surface portion of the tool includes disposing a plurality of film layers onto the first surface portion of the tool.

14. The method of claim 1, wherein the film is configured to be opaque; and the film is configured such that the coating is not visible through the film.

15. The method of claim 1, wherein the film is configured such that release agents are not required to remove the panel from the tool.

16. The method of claim 1, including:
   trimming the panel to a final footprint of the load structure; and
   performing final assembly to form the load structure.

17. The method of claim 1 further comprising positioning the paper layer over the first side of the panel to prevent penetration into a honeycomb structure of the panel.

18. A method of manufacturing a load structure, the method comprising:
   forming a panel;

clearing a fill passage through at least a portion of the panel;

providing a tool having a first surface portion, a second surface portion, and a cavity disposed between the first and second surface portions;

disposing a film onto the first surface portion of the tool;

disposing the panel within the cavity such that a portion of the panel engages the second surface portion of the tool, and an additional portion of the panel is spaced apart from first surface portion of the tool defining a void;

injecting a coating through the fill passage such that the coating fills the void and the film adheres to at least the additional portion of the panel;

wherein the first surface portion of the tool includes one or more features that are configured to imprint one or more indicia into the film; and prior to injecting the coating, positioning a paper layer over the additional portion of the panel such that the void is positioned between the film and the paper layer.

19. The method of claim 18, wherein the indicia include one or more of a logo, a pattern, a grain, a number, a letter, or a symbol.

20. A method of manufacturing a load structure comprising:

forming a panel;

clearing a fill passage in the panel;

providing a tool having a first surface portion, a second surface portion, and a cavity disposed between the first and second surface portions;

locating a film on one of the first surface portion or second surface portions of the tool;

positioning the panel within the cavity such that a portion of the panel engages the second surface portion of the tool, and an additional portion of the panel is spaced apart from the first surface portion of the tool defining a void;

injecting a coating through the fill passage; and prior to injecting the coating, positioning a paper layer over the additional portion of the panel such that the void is positioned between the film and the paper layer.

* * * * *